United States Patent
Kang et al.

(10) Patent No.: US 9,671,654 B2
(45) Date of Patent: Jun. 6, 2017

(54) LIQUID CRYSTAL DISPLAY AND METHOD FOR MANUFACTURING THE SAME

(71) Applicant: Samsung Display Co., Ltd., Yongin-si (KR)

(72) Inventors: Hoon Kang, Suwon-si (KR); Yang-Ho Jung, Seoul (KR); Chul Won Park, Gwangmyeong-si (KR); Dae Youn Park, Cheonan-si (KR); Jin Ho Ju, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/843,488

(22) Filed: Sep. 2, 2015

(65) Prior Publication Data
US 2016/0202528 A1 Jul. 14, 2016

(30) Foreign Application Priority Data
Jan. 9, 2015 (KR) .......................... 10-2015-0003668

(51) Int. Cl.
*G02F 1/1339* (2006.01)
*G02F 1/1335* (2006.01)

(52) U.S. Cl.
CPC .... *G02F 1/13394* (2013.01); *G02F 1/133514* (2013.01); *G02F 1/133512* (2013.01); *G02F 2001/13396* (2013.01)

(58) Field of Classification Search
CPC .......... G02F 1/13394; G02F 1/133345; G02F 1/133512; G02F 1/133514 G02F 1/133516; G02F 1/1368

IPC .................. G02F 1/13394,1/133345, 1/133512
See application file for complete search history.

(56) References Cited

U.S. PATENT DOCUMENTS

| | | | |
|---|---|---|---|
| 6,811,458 B2 | 11/2004 | Kouya | |
| 6,855,465 B2 | 2/2005 | Yi et al. | |
| 7,433,004 B2 | 10/2008 | Tsubata et al. | |
| 7,742,129 B2 * | 6/2010 | Li | G02F 1/133516 349/106 |
| 8,379,180 B2 | 2/2013 | Huang et al. | |
| 8,400,606 B2 | 3/2013 | Song | |
| 8,587,738 B2 | 11/2013 | Kim et al. | |

(Continued)

FOREIGN PATENT DOCUMENTS

| | | |
|---|---|---|
| KR | 10-0469514 | 2/2005 |
| KR | 10-0693959 | 3/2007 |

(Continued)

*Primary Examiner* — James Dudek
(74) *Attorney, Agent, or Firm* — H.C. Park & Associates, PLC

(57) ABSTRACT

A liquid crystal display including: a first insulating substrate; a plurality of color filters disposed on the first insulating substrate; a light blocking member disposed on the color filters; a second insulating substrate facing the first insulating substrate; and a spacer disposed between the first insulating substrate and the second insulating substrate. The spacer includes a main column spacer and a sub-column spacer spaced apart from each other by a predetermined distance, a protrusion protruding toward the second insulating substrate by stacking at least one sub-color filter on the color filter, the main column spacer is disposed on the protrusion, and the light blocking member and the spacer are made of the same material.

17 Claims, 9 Drawing Sheets

(56) References Cited

U.S. PATENT DOCUMENTS

2014/0049717 A1 2/2014 Kwak et al.
2014/0061797 A1* 3/2014 Choi ................. G02F 1/133711
　　　　　　　　　　　　　　　　　　257/347

FOREIGN PATENT DOCUMENTS

| KR | 10-0707013 | 4/2007 |
| KR | 10-0772940 | 11/2007 |
| KR | 10-0790354 | 1/2008 |
| KR | 10-0936958 | 1/2010 |
| KR | 10-2011-0027986 | 3/2011 |
| KR | 10-1056012 | 8/2011 |
| KR | 10-2014-0023710 | 2/2014 |

* cited by examiner

LIQUID CRYSTAL DISPLAY AND METHOD FOR MANUFACTURING THE SAME

CROSS-REFERENCE TO RELATED APPLICATION

This application claims priority from and the benefit of Korean Patent Application No. 10-2015-0003668, filed on Jan. 9, 2015, which is hereby incorporated by reference for all purposes as if fully set forth herein.

BACKGROUND

Field

Exemplary embodiments relate to a liquid crystal display and a method for manufacturing the same.

Discussion of the Background

Currently, flat panel displays are often used in display devices. Meanwhile, as the flat panel display, various display devices, such as a liquid crystal display, an organic light emitting diode display, a plasma display, an electrophoretic display, and an electrowetting display may be used.

The liquid crystal display is one of the flat panel displays which have been most widely used currently, and includes two sheets of display panels in which an electrode is formed, and a liquid crystal layer interposed therebetween. In the liquid crystal display, a voltage is applied to the field generating electrode to generate an electric field in the liquid crystal layer, and an orientation of liquid crystal molecules of the liquid crystal layer is determined and polarization of incident light is controlled based on the generated electric field to display an image.

Among the liquid crystal displays, a liquid crystal display which is being currently widely used has a structure in which field generating electrodes, such as a pixel electrode and a common electrode, are provided in two display panels, respectively. Meanwhile, the mainstream of the liquid crystal display has a structure in which one display panel (hereinafter, referred to as 'thin film transistor array panel') is arranged with a plurality of thin film transistors and pixel electrodes in a matrix form and the other display panel (hereinafter, referred to as 'common electrode display panel') is formed with red, green, and blue color filters, and the entire surface of the display panel is covered with a common electrode.

The liquid crystal display tends to suffer from misalignment since it is difficult to accurately align the pixel electrode and the color filter, which are formed in different display panels. To solve the above problem, a color filter-on-array ("COA"), in which a color filter and a pixel electrode are formed on the same display panel, has been suggested.

A gap between the liquid crystal layers interposed between the two display panels is called a cell gap, in which the cell gap affects the entire operational characteristics of a liquid crystal display, such as a response speed, a contrast ratio, a viewing angle, luminance uniformity, and the like. However, when the cell gap is non-uniform, a uniform image may not be displayed over the entire screen and thus, image quality may be reduced. Therefore, to keep the uniform cell gap over the entire area on a substrate, a spacer is formed on one side of two substrates. As the spacer, a column spacer (CS) has been mainly used.

For process simplification, the light blocking member, such as a black matrix, and the spacer may be simultaneously formed. To simultaneously form the light blocking member, the spacer, and the like, there is a need to implement a multi-step process.

In the related art, a light blocking member and a spacer are used as one material, and the light blocking member and the spacer are formed using a mask which may implement multi-transmittance.

However, the mask which may implement the multi-transmittance is difficult to manufacture and has a complicated structure, which results in increased manufacturing costs of the liquid crystal display, such that it is difficult to secure thickness uniformity for the light blocking member and a column spacer.

The above information disclosed in this Background section is only for enhancement of understanding of the background of the invention and, therefore, it may contain information that does not form the prior art that is already known in this country to a person of ordinary skill in the art.

SUMMARY

Exemplary embodiments provide a liquid crystal display and a method for manufacturing the same having advantages of simultaneously forming a light blocking member and a spacer in multiple steps.

Additional aspects will be set forth in the detailed description which follows, and, in part, will be apparent from the disclosure, or may be learned by practice of the inventive concept.

An exemplary embodiment discloses a liquid crystal display, including: a plurality of color filters disposed on a first insulating substrate; a light blocking member disposed on the plurality of color filters; a second insulating substrate facing the first insulating substrate; and a spacer disposed between the first insulating substrate and the second insulating substrate. The spacer includes a main column spacer and a sub-column spacer which are spaced apart from each other by a predetermined distance, a protrusion protruding toward the second insulating substrate is formed by stacking at least one sub-color filter on the color filter, the main column spacer is positioned on the protrusion, and the light blocking member and the spacer are made of the same material.

An exemplary embodiment also discloses a method for manufacturing a liquid crystal display includes: forming a plurality of color filters on a first insulating substrate and forming a protrusion in which at least one sub-color filter is stacked on the color filter; forming a light blocking member and a spacer on the plurality of color filters; and forming a second insulating substrate facing the first insulating substrate. The spacer includes a main column spacer and a sub-column spacer that are spaced apart from each other by a predetermined distance, any one of the main column spacer and the sub-column spacer is disposed on the protrusion, and the light blocking member and the spacer are made of the same material.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
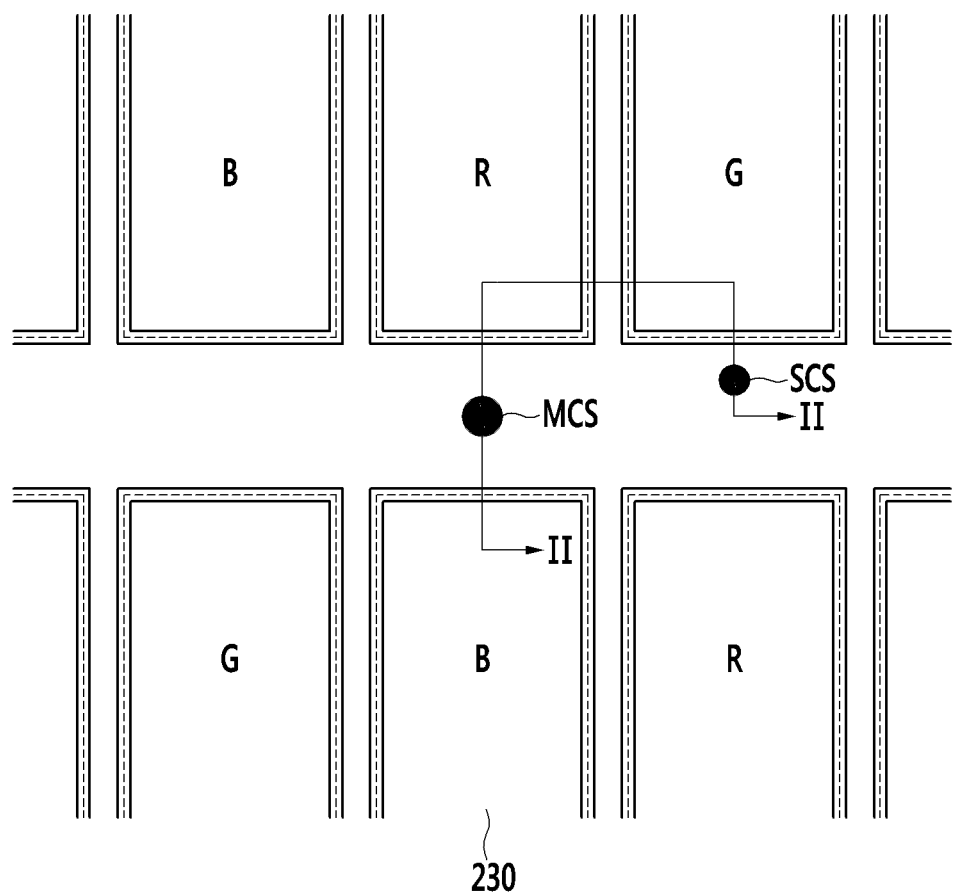
FIG. 1 is a plan view illustrating a liquid crystal display according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, an exemplary embodiment of the present invention will be described in detail with reference to the accompanying drawings.

Figure 2:
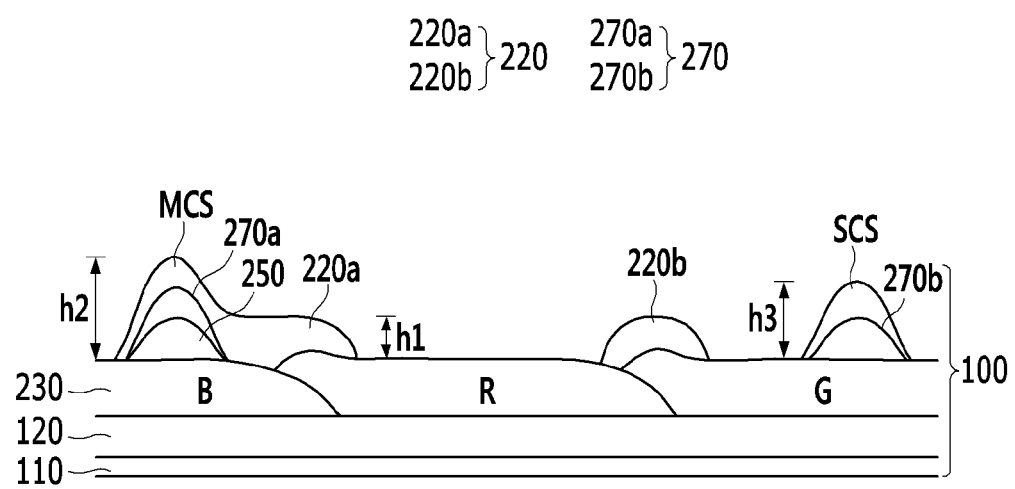
FIG. 2 is a cross-sectional view taken along line II-II of FIG. 1.

FIG. 1 is a plan view illustrating a liquid crystal display according to an exemplary embodiment of the present invention, and FIG. 2 is a cross-sectional view taken along line II-II of FIG. 1.

Referring to FIGS. 1 and 2, a film structure 120 including a thin film transistor is positioned on a lower substrate 110.

The thin film transistor is a switching element and may be configured of three terminals of a control terminal, an input terminal, and an output terminal, which will be described below in detail.

The plurality of color filters 230 are positioned on the film structure 120. The color filters 230 include a red color filter (R), a green color filter (G), and a blue color filter (B). The color filters 230 may be each formed in parallel with each other in a horizontal direction, or may be formed in a stripe form along a vertical direction. Both ends of the color filters 230, respectively, are formed to partially overlap each other.

A protrusion 270 is positioned on the color filters 230. In this case, the protrusion 270 is formed by stacking at least one sub-color filter 250 on at least one of the color filters 230.

The protrusion 270 includes a first protrusion 270a and a second protrusion 270b, which differ in the stacked number of sub-color filters 250. The number of sub-color filters 250 forming the first protrusion 270a may be greater than the number of sub-color filters 250 forming the second protrusion 270b. As illustrated in FIG. 2, the first protrusion 270a is formed by stacking two sub-color filters 250, and the second protrusion 270b is formed by stacking one color filter 250. The two sub-color filters 250 forming the first protrusion 270a may be the color filter 230 having different colors.

The exemplary embodiment of the present invention describes an example in which the number of sub-color filters 250 forming the protrusion 270 is no more than two, but is not limited thereto, and if the number of sub-color filters 250 forming the first protrusion 270a positioned beneath a main column spacer MCS is greater than the number of sub-color filters 250 forming the second protrusion 270b, the number of sub-color filters 250 forming the protrusion 270 may be disregarded.

A spacer is positioned on the protrusion 270. The spacer includes the main column spacer MCS and a sub-column spacer SCS, in which the main column spacer MCS is positioned on the first protrusion 270a and the sub-column spacer SCS is positioned on the second protrusion 270b.

A light blocking member 220 is positioned on the color filters 230. That is, the light blocking member 220 is positioned at a point where both ends of the color filters 230, respectively, partially overlap each other. Because the color filters 230 which are adjacent to each other are formed to overlap each other, as illustrated in FIG. 2, a step occurs as a result of the color filter 230. The light blocking member 220 is formed at the point where the step occurs.

The light blocking member 220 and the spacer MCS, SCS may be made of the same material.

The light blocking member 220 includes a first light blocking member 220a and a second light blocking member 220b. The first light blocking member 220a may be integrally formed with the main column spacer MCS. As illustrated in FIG. 1, the first light blocking member 220a may be positioned at a point which extends in a horizontal direction and the second light blocking member 220b may be positioned at a point which extends in a vertical direction.

A height h3 of the sub-column spacer SCS may be formed to be less than a height h2 of the main column spacer MCS, and may be formed to be greater than a height h1 of the light blocking member 220. That is, among the main column spacer MCS, the sub-column spacer SCS, and the light blocking member 220, the height h2 of the main column spacer MCS may be formed to be the highest, and the height h1 of the light blocking member 220 may be formed to be the lowest.

As illustrated in FIGS. 1 and 2, according to the exemplary embodiment of the present invention, the protrusion 270 is formed by stacking the sub-color filter 250 on the color filter 230 and the heights of the main column spacer MCS and the sub-column spacer SCS may be maintained using the protrusion 270, without using a multi tone mask.

Hereinafter, the liquid crystal display embodying the exemplary embodiment of FIG. 1 will be described with reference to FIGS. 3 and 4.

Figure 3:
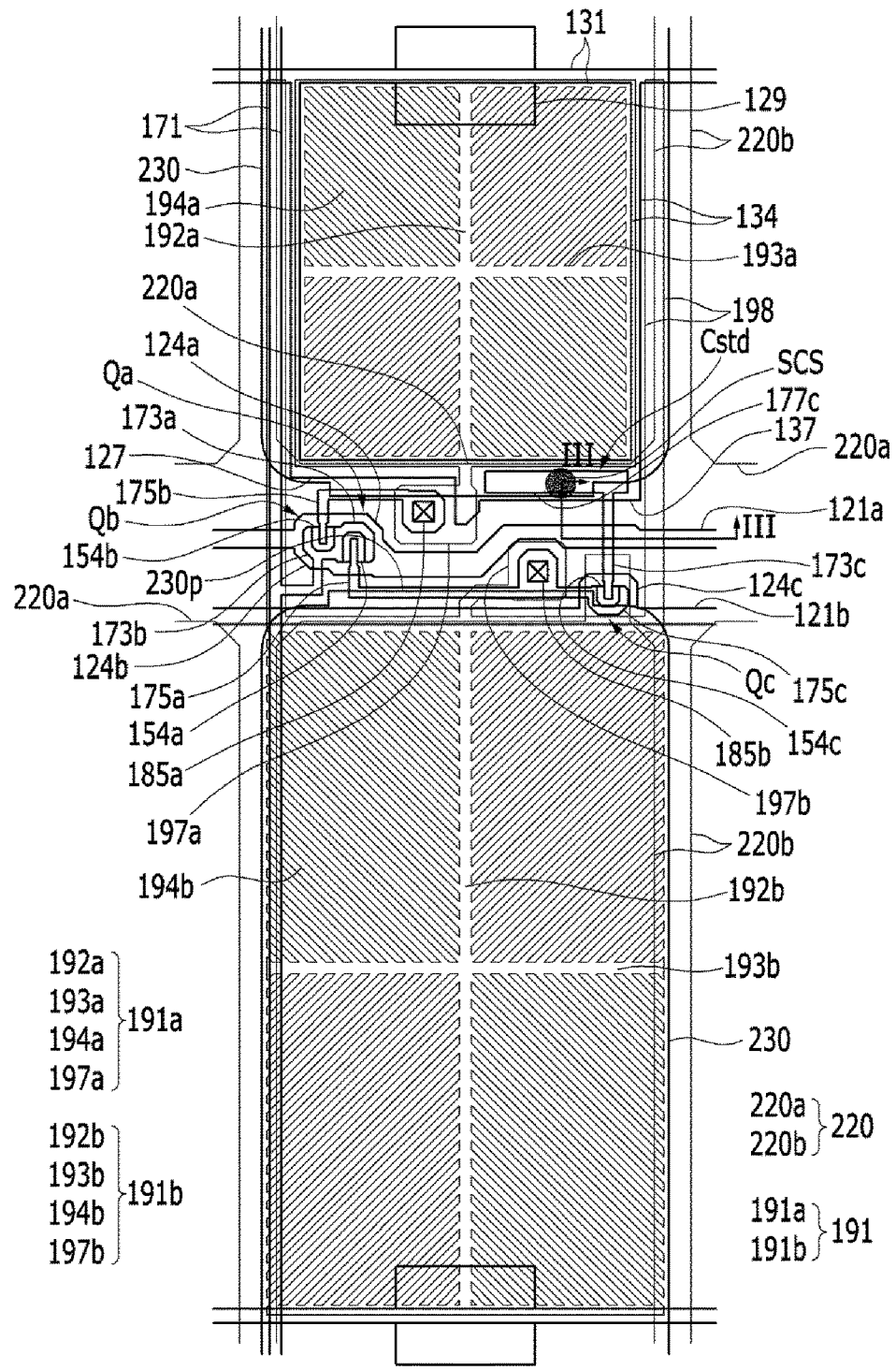
FIG. 3 is a plan view illustrating the liquid crystal display embodying the exemplary embodiment of FIG. 1.
Figure 4:
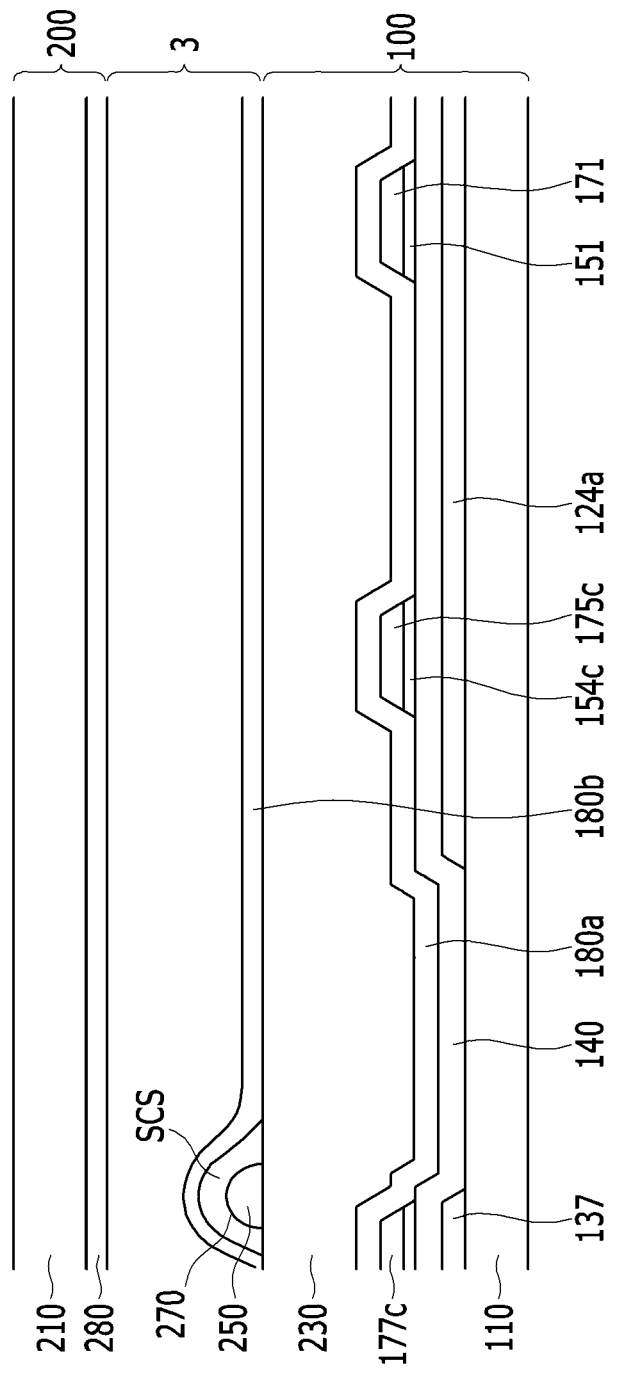
FIG. 4 is a cross-sectional view taken along the line III-III of FIG. 3.

FIG. 3 is a plan view illustrating the liquid crystal display embodying the exemplary embodiment of FIG. 1, and FIG. 4 is a cross-sectional view taken along the line III-III of FIG. 3.

Referring to FIGS. 3 and 4, the liquid crystal display according to an exemplary embodiment of the present invention includes a lower panel 100 and an upper panel 200 facing each other, and a liquid crystal layer 3 interposed between the two display panels 100 and 200.

A plurality of gate lines, including a first gate line 121a and a second gate line 121b, and a plurality of gate conductors, including a plurality of sustain electrode lines 131, are formed on the lower substrate 110.

The gate lines 121a and 121b mainly extend in a horizontal direction and transfer gate signals. The first gate line 121a includes a first gate electrode 124a and a second gate electrode 124b which protrude upward and downward, and the second gate line 121b includes third gate electrode 124c, which protrudes upward. The first and second gate electrodes 124a and 124b are connected to each other to form one protrusion.

The sustain electrode line 131 mainly extends in the horizontal direction to transfer a defined voltage, such as a common voltage Vcom. The sustain electrode line 131 includes a sustain electrode 129 which protrudes upward and downward, a pair of vertical parts 134 which substantially vertically extends downward to the gate lines 121a and 121b, and a horizontal part 127 which connect tips of the pair of vertical parts 134 to each other. The horizontal part 127 includes a capacitive electrode 137, which extends downward.

A gate insulating layer 140 is formed on the gate conductors 121a, 121b, and 131.

A plurality of linear semiconductors 151, which may be made of amorphous silicon, crystalline silicone, or the like, are formed on the gate insulating layer 140. The linear semiconductors 151 may mainly extend in a vertical direction and includes first and second semiconductors 154a and 154b, which extend toward the first and second gate electrodes 124a and 124b and are connected to each other, and a third semiconductor which is positioned on the third gate electrode 124c.

A plural pairs of ohmic contacts (not illustrated) are formed on the semiconductors 154a, 154b, and 154c. The ohmic contact (not illustrated) may be made of a material such as n+ hydrogenated amorphous silicon, which is doped with silicide or n-type impurities at high concentration.

A data conductor which includes a plurality of data lines 171, a plurality of first drain electrodes 175a, a plurality of second drain electrodes 175b, and a plurality of third drain electrodes 175c is formed on the ohmic contact.

The data line 171 transfer the data signal and mainly extend in a vertical direction to intersect the gate lines 121a and 121b. Each data line 171 includes a first source electrode 173a and a second source electrode 173b, which extend toward the first gate electrode 124a and the second gate electrode 124b and are connected to each other.

The first drain electrode 175a, the second drain electrode 175b, and the third drain electrode 175c include a wide one tip portion and the other tip portion having a bar shape. The bar-shaped end of each of the first and second drain electrodes 175a and 175b is partially enclosed with the first and second source electrodes 173a and 173b. The wide one tip portion of the first drain electrode 175a may again extend to form the third drain electrode 175c which is bent in a 'U'-letter shape. A wide tip portion 177c of the third source electrode 173c overlaps the capacitive electrode 137 to form a step-down capacitor Cstd and the bar-shaped tip portion thereof is partially enclosed with the third drain electrode 175c.

The first gate electrode 124a, the first source electrode 173a, and the first drain electrode 175a form a first thin film transistor Qa along with the first semiconductor 154a, the second gate electrode 124b, the second source electrode 173b, and the second drain electrode 175b form a second thin film transistor Qb along with the second semiconductor 154b, and the third gate electrode 124c, the third source electrode 173c, and the third drain electrode 175c form a third thin film transistor Qc along with the third semiconductor 154c.

The linear semiconductors 151, which include the first semiconductor 154a, the second semiconductor 154b, and the third semiconductor 154c, may have substantially the same plane shape as the data conductors 171, 173a, 173b, 173c, 175a, 175b, and 175c and the ohmic contacts thereunder except for a channel region between the source electrodes 173a, 173b, and 173c and the drain electrodes 175a, 175b, and 175c.

The first semiconductor 154a has a portion, which is exposed by not being covered with the first source electrode 173a and the first drain electrode 175a between the first source electrode 173a and the first drain electrode 175a, the second semiconductor 154b has a portion which is exposed by not being covered with the second source electrode 173b and the second drain electrode 175b between the second source electrode 173b and the second drain electrode 175b, and the third semiconductor 154c has a portion which is exposed by not being covered with the third source electrode 173c and the third drain electrode 175c between the third source electrode 173c and the third drain electrode 175c.

A first passivation layer 180a, which may be made of an inorganic insulating material, such as silicon nitride and silicon oxide, is formed on the data conductors 171, 173a, 173b, 173c, 175a, 175b, and 175c and exposed portions of the semiconductors 154a, 154b, and 154c.

The plurality of color filters 230 are formed on the first passivation layer 180a. The color filters 230 include a red color filter, a green color filter, and a blue color filter, which are formed to partially overlap one another in a horizontal direction. Both ends of the each of the color filters 230, respectively, are formed to partially overlap each other.

The protrusion 270 is formed by stacking at least one sub-color filter 250 on the plurality of color filters 230. That is, the protrusion 270 may be formed to protrude from the color filter 230 toward the upper panel 200. The sub-color filter 250 may be formed of a color different from the color filter 230 which is positioned beneath the sub-color filter 250.

The spacer is positioned on the protrusion 270. The spacer includes the main column spacer MCS and the sub-column spacer SCS. The main column spacer MCS and the sub-column spacers SCS may be formed in one pixel, or may also be formed in different pixels.

As illustrated in FIG. 2, the light blocking member 220 is positioned at a point where both ends of the plurality of color filter 230 overlap each other. The light blocking member 220 includes a second light blocking member 220b, which is formed independently of the first light blocking member 220a, which is integrally formed with the main column spacer MCS.

The light blocking member 220 may be made of the same material as the main column spacer MCS and the sub-column spacer SCS.

The height of the spacer may be maintained by the protrusion 270, and therefore, the spacer may support a space between the upper panel 200 and the lower panel 100. That is, the main column spacer MCS supports the space between the upper panel 200 and the lower panel 100, and the sub-column spacer serves to assist a role of the main column spacer MCS so as to support the space between the upper panel 200 and the lower panel 100.

A second passivation layer 180b is formed on the color filters 230, the spacer, and the light blocking member 220. The second passivation layer 180b may be formed as an organic layer. The second passivation layer 180b, which is formed as the organic layer includes a portion just on the color filter 230 and a portion just on the first passivation layer 180a.

A pixel electrode 191, which includes a first subpixel electrode 191a and a second subpixel electrode 191b, is formed on the second passivation layer 180b. The first subpixel electrode 191a and the second subpixel electrode 191b are each disposed up and down, being spaced apart from each other having the first gate line 121a and the second gate line 121b disposed therebetween, and thus, are adjacent to each other in a column direction. A height of the second subpixel electrode 191b may be approximately one time to three times that of the first subpixel electrode 191a.

The entire shape of the first subpixel electrode 191a and the second subpixel electrode 192b, respectively, is a quadrangle, and each of the first subpixel electrode 191a and the second subpixel electrode 191b includes a cruciform stem part which is configured of horizontal stem parts 193a and 193b and vertical stem parts 192a and 192b intersecting the horizontal stem parts 193a and 193b. Further, the first subpixel electrode 191a and the second subpixel electrode 191b each include a plurality of fine branch parts 194a and 194b, a lower protrusion 197a, and an upper protrusion 197b.

The pixel electrode 191 is divided into four sub-areas by the horizontal stem parts 193a and 193b and the vertical stem parts 192a and 192b. The fine branch parts 194a and 194b obliquely extend from the horizontal stem parts 193a and 193b and the vertical stem parts 192a and 192b and an extending direction thereof may form an angle of approximately 45° or 135° with respect to the gate lines 121a and 121b or the horizontal stem parts 193a and 193b. The fine branch parts 194a and 194b of the two sub-areas which are adjacent to each other may be orthogonal to each other.

According to an exemplary embodiment of the present invention, the first subpixel electrode 191a further includes an outside stem part, which encloses an outside, and the second subpixel electrode 191b further includes horizontal parts, which are positioned at an upper portion and a lower portion, and left and right vertical parts 198, which are positioned at the left and right of the first subpixel electrode 191a. The left and right vertical parts 198 may prevent capacitive coupling; that is, coupling between the data line 171 and the first subpixel electrode 191a. The left and right vertical part 198 may also be omitted.

The first passivation layer 180a is provided with a plurality of first contact holes 185a and a plurality of second contact holes 185b through which a wide tip portion of the first drain electrode 175a and a wide tip portion of the second drain electrode 175b are each exposed. The first contact hole 185a may connect between the second subpixel electrode 191b and the third drain electrode 175c, and the second contact hole 185b may connect between the first subpixel electrode 191a and the second drain electrode 175b.

Next, describing the upper panel 200, the common electrode 280 is formed on the upper substrate 210 and an upper alignment layer (not illustrated) may be formed on the common electrode 280. The common electrode 280 transfers a common voltage.

The liquid crystal layer 3 has a negative dielectric anisotropy, and the liquid crystal molecules of the liquid crystal layer 3 are aligned so that the major axes thereof are vertical to the surfaces of the two display panels 100 and 200 in the state in which no electric field is present. The liquid crystal layer 3 includes alignment aids including reactive mesogen, and thus, liquid crystal molecules may have a pretilt so that a major axis of the liquid crystal molecule is approximately parallel with a length direction of the fine branch parts 194a and 194b of the pixel electrode 191. The alignment aids are not included in the liquid crystal layer, but may be included in the alignment layer.

The structure of the thin film transistor described with reference to FIGS. 3 and 4 is only one example, and therefore, the film structure including the structure of the thin film transistor may be modified in various forms.

Hereinafter, a method for manufacturing a liquid crystal display according to an exemplary embodiment of the present invention will be described with reference to FIGS. 5 and 6.

Figure 5:
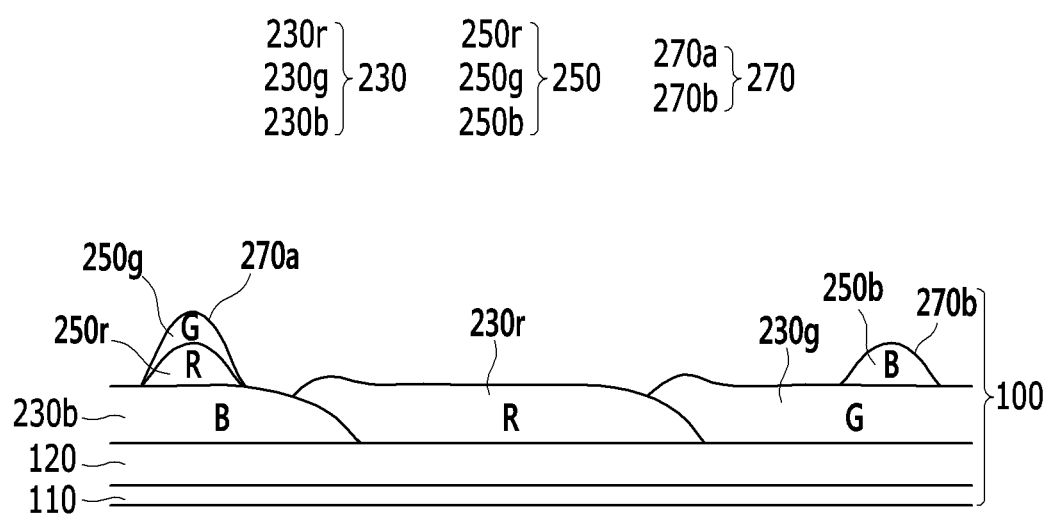
FIGS. 5 and 6 are cross-sectional views illustrating a method for manufacturing a liquid crystal display according to the exemplary embodiment of the present invention.
Figure 6:
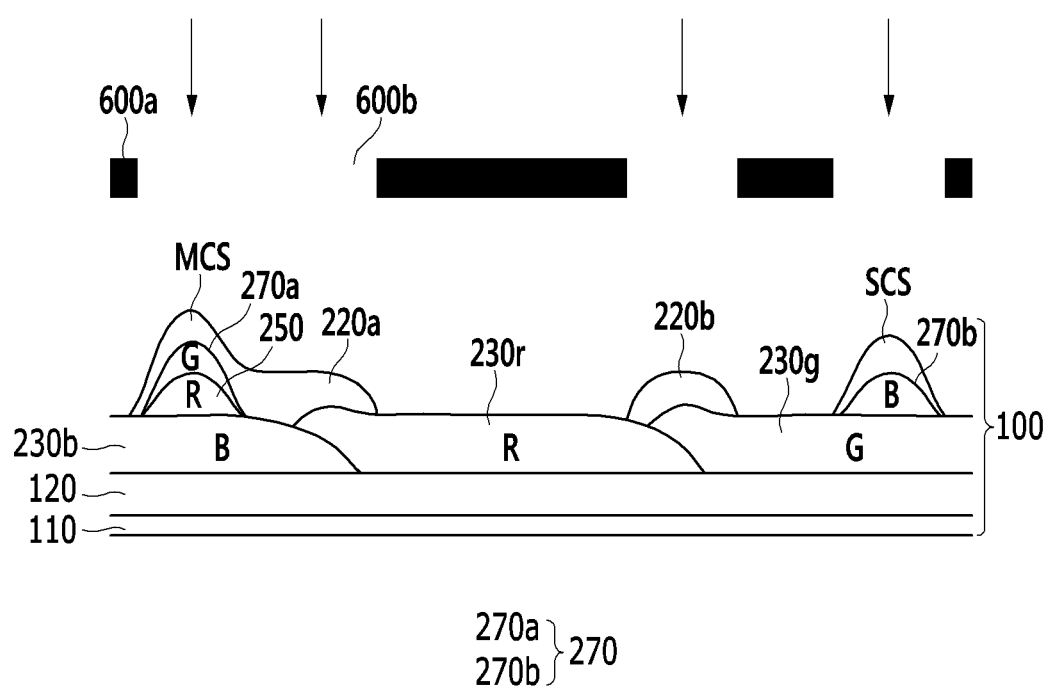

FIGS. 5 and 6 are cross-sectional views illustrating a method for manufacturing a liquid crystal display according to the exemplary embodiment of the present invention.

Referring to FIG. 5, the color filter 230 is formed on the lower substrate 110.

First, as described with reference to FIGS. 3 and 4, the film structure 120 including the thin film transistor structure is formed on the lower substrate 110.

The color filter 230 is formed on the film structure 120 including the thin film transistor structure.

In detail, the blue color filter 230b is formed on the film structure 120. Further, a red color filter 230r is formed on the film structure 120 to partially overlap the blue color filter 230b, and a red sub-color filter 250r is formed on the blue color filter 230b using the red color filter 230r. The blue color filter 230b and the red color filter 230r are formed on the film structure 120 to partially overlap each other, and a green color filter 230g is formed on the film structure 120 to partially overlap the red color filter 230r and a green sub-color filter 250g is formed on the red sub-color filter 250 using the green color filter 230g. The red sub-color filter 250r and the green sub-color filter 250g are stacked to form the first protrusion 270a. Next, although not illustrated in FIG. 5, the blue color filter 230b is formed to partially overlap the green color filter 230g and the blue sub-color filter 250b is formed on the green color filter 230g using the blue color filter 230b to form the second protrusion 270b. Here, the color filter 230 may be formed using a photolithography process and may also be formed by an inkjet method, and the like, in addition to the photolithography process. The sub-color filter 250 may be formed by the photolithography process, the inject method, etc., which are the same method as used for forming the color filter 230.

The exemplary embodiment of the present invention describes an example in which the color filter 230 is formed in an order of blue, red, and green, but is not limited thereto, and therefore, an order of the color filter 230 may be disregarded. Further, the same color of color filters 230 may be repeatedly formed to partially overlap each other.

Further, the exemplary embodiment of the present invention describes an example in which different colors of sub-color filters 250 are stacked but is not limited thereto, and therefore, the protrusion 270 may also be formed by stacking the same color.

Referring to FIG. 6, the spacer and the light blocking member 220 are formed on the plurality of color filters 230 using the first mask.

In detail, a photo resist PR is formed on the plurality of color filters 230 and the protrusion 270 to form the spacer and the light blocking member 220. Here, the photo resist may be a negative photo resist.

A first mask 600 is disposed over the lower substrate 110 on which the plurality of color filters 230 and the protrusion 270 are formed. The first mask 600 includes a blocking area 600a and a transmitting area 600b. An area in which the light blocking member 220 and the spacer are formed is provided with the transmitting area 600b in the first mask 600 and the area in which the light blocking member 220 and the spacer 220 are not formed is provided with the shielding area 600a. Further, in the area in which the light blocking member 220 and the spacer are formed, light transmittance may be set to be 100%.

The main column spacer MCS and the first light blocking member 220a may be integrally formed at a position where the first protrusion 270a is formed. Therefore, the first light blocking member 220a and the main column spacer MCS may be formed to have different heights while being formed simultaneously. That is, the main column spacer MCS may be higher than that of the main column spacer (MCS) by the height of the first protrusion 270a.

Further, without being etched after the photo process, the sub-column spacer SCS may be formed at a position where the second protrusion 270b is formed, and the second light blocking member 220b may be formed at a position where the color filters 230 overlap each other.

The column spacer MCS, the first light blocking member 220a, the second light blocking member 220b, and the sub-column spacer SCS may be made of the same material.

Therefore, in the liquid crystal display according to the exemplary embodiment of the present invention, the main column spacer MCS, the sub-column spacer SCS, and the light blocking member 220 may be formed to have different heights without using the multi tone mask.

Next, when the upper panel 200 including the common electrode 280 is formed on the upper substrate 210 and is boned to the already formed lower panel 100 and then the liquid crystal layer 3 is formed, the liquid crystal display including the light blocking member 220 and the spacer having a multi step according to the exemplary embodiment of the present invention may be formed.

Hereinafter, a method for manufacturing a liquid crystal display according to another exemplary embodiment of the present invention will be described with reference to FIG. 7.

Figure 7:
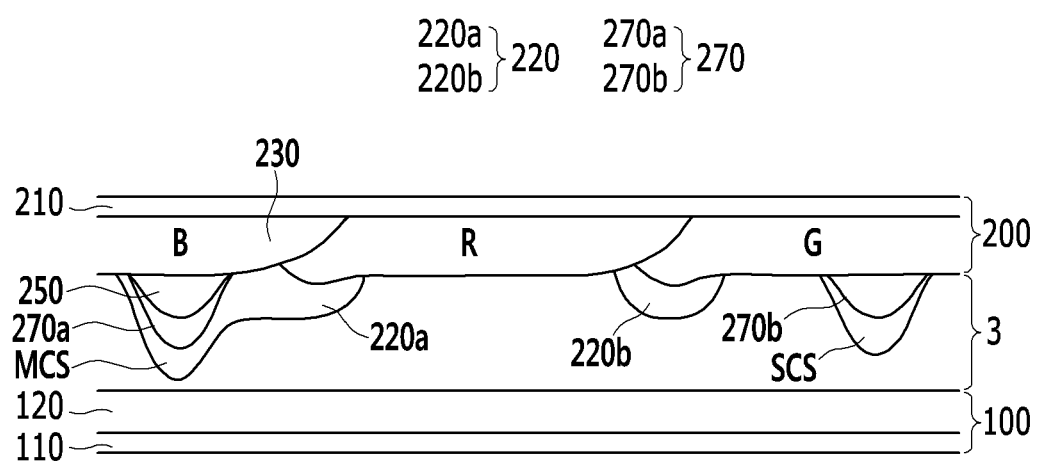
FIG. 7 is a cross-sectional view illustrating a liquid display device according to another exemplary embodiment of the present invention.

FIG. 7 is a plan view illustrating a liquid crystal display according to another exemplary embodiment of the present invention, in which the liquid crystal display is the same as the liquid crystal display illustrated in FIGS. 1 and 2 as described above, except that the position where the plurality of color filters 230, the light blocking member 220, and the spacer are formed is changed. Therefore, the same components other than the changed components are denoted by the same reference numeral, and therefore, the same components will be briefly described.

Referring to FIG. 7, the liquid crystal display includes the lower panel 100 and the upper panel 200 which face each other and the liquid crystal layer 3.

The film structure, including the thin film transistor, is positioned on the lower substrate 110.

The color filters 230 are positioned on the upper substrate 210. In this case, both ends of each of the plurality of color filters 230, respectively, are formed to partially overlap each other.

The protrusion 270 is formed by stacking the sub-color filter 250 on at least one color filter 230 of the plurality of color filters 230. The protrusion 270 includes the first protrusion 270a and the second protrusion 270b. The first protrusion 270a and the second protrusion 270b have a difference in the stacked number of sub-color filters 250, and the number of sub-color filters 250 stacked on the first protrusion 270a may be greater than the number of sub-color filter 250 stacked on the second protrusion 270b.

The spacer is positioned on the protrusion 270. That is, the main column spacer MCS is positioned on the first protrusion 270a and the sub-color spacer is positioned on the second protrusion 270b. The main column spacer MCS and the sub-column spacer SCS may be formed to have different heights as a result of the first protrusion 270a and the second protrusion 270b.

The light blocking member 220 is positioned on the color filters 230. In other words, the light blocking member 220 is positioned at the point where the color filters 230 are stacked, and the light blocking member 220 includes the first light blocking member 220a and the second light blocking member 220b. The first light blocking member 220a is positioned at the point where the color filters 230 are stacked, and is integrally formed with the main column spacer MCS. The second light blocking member 220b is positioned at the point where the color filters 230 are stacked and is formed independently of the spacer, not being integrally formed with the spacer.

The liquid crystal layer 3 is interposed between the lower panel 100 and the upper panel 200.

Therefore, in the liquid crystal display according to the exemplary embodiment of the present invention, the plurality of color filter 230, the light blocking member 220, and the spacer may also be formed on the upper substrate 210, as described with reference to FIG. 7 and may be formed on the lower substrate 110 as described with reference to FIGS. 1 to 6.

Hereinafter, a method for manufacturing a liquid crystal display according to another exemplary embodiment of the present invention will be described with reference to FIG. 8.

Figure 8:
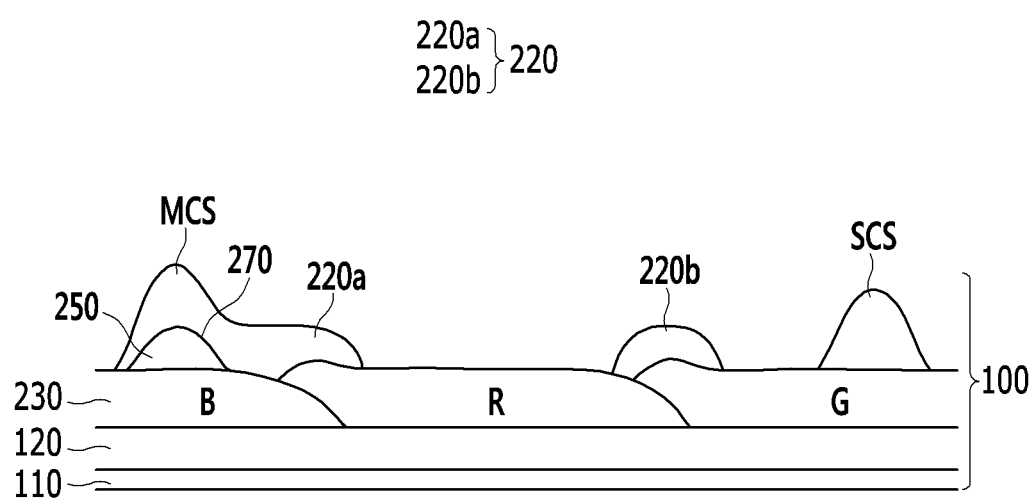
FIG. 8 is a cross-sectional view illustrating a liquid display device according to another exemplary embodiment of the present invention.

FIG. 8 is a cross-sectional view illustrating a liquid crystal display according to another exemplary embodiment of the present invention, in which the liquid crystal display is the same as the liquid crystal display illustrated in FIGS. 1 and 2 as described above except that the protrusion 270 is changed. Therefore, the same components other than the changed components are denoted by the same reference numeral, and therefore, the same components will be briefly described.

Referring to FIG. 8, the film structure 120 including the thin film transistor is positioned on the lower substrate 110.

The color filters 230 are positioned on the film structure 120 to partially overlap each other.

The protrusion 270 is positioned on at least one color filter 230 of the color filters 230. For example, the protrusion 270 is formed by stacking the sub-color filter 250 on the blue color filter, as illustrated in FIG. 8. In this case, the protrusion 270 may be formed by stacking one sub-color filter 250.

The spacer 230 is positioned on the color filters 230. The spacer includes the main column spacer MCS which is positioned on the protrusion 270, and the sub-column spacer SCS, which is positioned on at least one of the color filters 230.

The light blocking member 220 is positioned at the point where the color filters 230 overlap each other. The first light blocking member 220a is integrally formed with the main column spacer MCS, and the second light blocking member 220b is positioned at the point where the color filters 230 overlap each other.

Hereinafter, the method for manufacturing a liquid crystal display as illustrated in FIG. 8 will be described with reference to FIG. 9.

Figure 9:
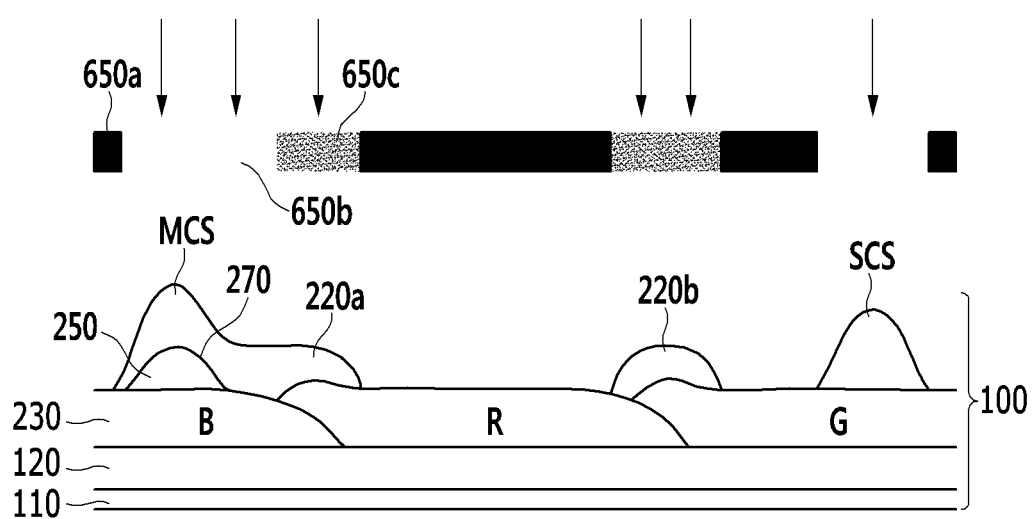
FIG. 9 is a cross-sectional view illustrating a method for manufacturing a liquid crystal display of FIG. 8.

FIG. 9 is a cross-sectional view illustrating a method for manufacturing a liquid crystal display of FIG. 8, in which the method is the same as the method for manufacturing a liquid crystal display as illustrated in FIGS. 5 and 6 as described above except for the method for forming the protrusion 270, the light blocking member 220, and the spacer. Therefore, the repetitive description of the same manufacturing method other than the changed manufacturing method will be omitted.

Referring to FIG. 9, the film structure 120 including the thin film transistor is formed on the lower substrate 110, and the color filters 230 are formed on the film structure 120. In this case, the color filters 230 may be formed so that both ends of the blue color filter, the red color filter, and the green color filter sequentially overlap each other as illustrated in FIG. 9. The color filters 230 may be formed by the inkjet method, the photo lithography process, etc.

The protrusion 270 is positioned on the color filters 230. As illustrated in FIG. 9, the protrusion 270 may be formed by forming the sub-color filter 250 on the blue color filter 230b using the red color filter 230r or the green color filter 230g.

The photo resist is formed on the plurality of color filters 230 and the protrusion 270. The photo register may be a negative photo resist.

A second mask 650 is disposed over the lower substrate 110 on which the plurality of color filters 230 and the protrusion 270 are formed. Here, the second mask 650 may be the two tone mask and may include a blocking area 650a, a transmitted area 650b, and a transflective area 650c. The two tone mask may be a half tone mask or a slit mask.

The area in which the main column spacer MCS and the sub-column spacer SCS are formed is provided with the transmitted area 650b in the second mask 650, the area in which the light blocking member 220 is formed is provided with the transflective area 650c in the second mask 650, and the area in which the light blocking member 220 and the spacer are not formed is provided with the blocking area 650a.

In the area in which the main column spacer MCS and the sub-column spacer SCS are formed, the light transmittance may be set to be 100%, and in the area in which the light blocking member 220 is formed, the light transmittance may be set to be 50%.

The main column spacer MCS and the sub-column spacer SCS may be formed at the position which is not etched or partially etched after the photo process and the light blocking member 220 having a lower height than the main column spacer MCS and the sub-column spacer SCS by the partial etching may be formed. In this case, the main column spacer MCS is formed on the protrusion 270 and therefore may have a height greater than the sub-column spacer SCS.

Therefore, in the liquid crystal display according to the exemplary embodiment of the present invention, the main column spacer MCS, the sub-column spacer SCS, and the light blocking member 220 may be formed to have different heights using the protrusion 270.

According to the liquid crystal display according to exemplary embodiments of the present invention, it is possible to simplify the manufacturing process and reduce the manufacturing costs by stacking the color filters to simultaneously form the light blocking member and the spacer such that each have different heights.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display, comprising:
   a plurality of color filters disposed on a first insulating substrate;
   a light blocking member disposed on the plurality of color filters;
   a second insulating substrate facing the first insulating substrate; and
   a spacer disposed between the first insulating substrate and the second insulating substrate,
   wherein:
   the spacer comprises a main column spacer and a sub-column spacer spaced apart from each other at a predetermined distance;
   a protrusion protruding toward the second insulating substrate is formed by stacking at least one sub-color filter on the color filter;
   the main column spacer is disposed on the protrusion;
   the light blocking member and the spacer are made of the same material; and
   a height of the main column spacer, the sub-column spacer, and the light blocking member from the first insulating substrate are different.

2. The liquid crystal display of claim 1, wherein:
   the sub-column spacer is disposed on the protrusion; and
   the protrusion comprises:
   a first protrusion disposed beneath the main column spacer; and
   a second protrusion disposed beneath the sub-column spacer.

3. The liquid crystal display of claim 2, wherein the number of sub-color filters stacked on the first protrusion is different from the number of sub-color filters stacked on the second protrusion.

4. The liquid crystal display of claim 2, wherein the number of sub-color filters stacked on the first protrusion is greater than the number of sub-color filters stacked on the second protrusion.

5. The liquid crystal display of claim 1, wherein the sub-column spacer is disposed on the color filter.

6. The liquid crystal display of claim 1, wherein a height of the sub-column spacer is greater than that of the light blocking member and less than that of the main column spacer.

7. The liquid crystal display of claim 1, wherein:
   both ends of the color filters, respectively, partially overlap each other; and
   the light blocking member is disposed at a position where the color filters overlap each other.

8. The liquid crystal display of claim 1, wherein the light blocking member comprises:
   a first light blocking member integrally formed with the main column spacer and disposed at an overlapping point of the color filters; and
   a second light blocking member disposed at the overlapping point of the color filters.

9. The liquid crystal display of claim 1, further comprising a thin film transistor disposed beneath the color filters or on the second insulating substrate.

10. A method for manufacturing a liquid crystal display, the method comprising:
    forming a plurality of color filters on a first insulating substrate and forming a protrusion in which at least one sub-color filter is stacked on the color filter;
    forming a light blocking member and a spacer on the color filters; and
    forming a second insulating substrate facing the first insulating substrate,
    wherein:
    the spacer comprises a main column spacer and a sub-column spacer which are spaced apart from each other by a predetermined distance;
    the main column spacer is disposed on the protrusion;
    the light blocking member and the spacer are made of the same material; and
    a height of the main column spacer, the sub-column spacer, and the light blocking member from the first insulating substrate are different.

11. The method of claim 10, wherein the forming of the color filters on the first insulating substrate and the forming of the protrusion in which the at least one sub-color filter is stacked on the color filter comprises:
    forming the color filters on the first insulating substrate;
    forming a first protrusion in which the at least one sub-color filter is stacked on at least one of the color filters; and
    forming a second protrusion spaced apart from the first protrusion by a predetermined distance.

12. The method of claim 11, wherein:
    both ends of the color filters, respectively, partially overlap each other; and
    the forming of the light blocking member and the spacer on the color filters comprises:
    forming a first light blocking member at an overlapping point of the color filters;
    forming a main column spacer connected to the first light blocking member and disposed on the first protrusion;
    forming a sub-column spacer at a point spaced apart from the main column spacer by a predetermined distance; and
    forming a second light blocking member at the overlapping point of the color filters.

13. The method of claim 11, wherein the number of sub-color filters stacked on the first protrusion is different from the number of sub-color filters stacked on the second protrusion.

14. The method of claim 11, wherein the number of sub-color filters stacked on the first protrusion is greater than the number of sub-color filters stacked on the second protrusion.

15. The method of claim 10, wherein the sub-column spacer is disposed on the color filter.

16. The method of claim 15, wherein the forming of the light blocking member and the spacer on the color filters comprises integrally forming the main column spacer and the light blocking member on the color filters by using a two tone mask.

17. The method of claim 10, further comprising forming a thin film transistor on the first insulating substrate or the second insulating substrate.

* * * * *